(12) United States Patent
Nurminen et al.

(10) Patent No.: US 8,832,138 B2
(45) Date of Patent: Sep. 9, 2014

(54) SYSTEM AND METHOD FOR SOCIAL NETWORK SEARCH OPERATIONS

(75) Inventors: Jukka K. Nurminen, Espoo (FI); Balazs Bakos, Törökbálint (HU); Lorant Farkas, Budapest (HU)

(73) Assignee: Nokia Corporation, Espoo (FI)

( * ) Notice: Subject to any disclaimer, the term of this patent is extended or adjusted under 35 U.S.C. 154(b) by 219 days.

(21) Appl. No.: 10/870,205

(22) Filed: Jun. 17, 2004

(65) Prior Publication Data

US 2005/0283497 A1    Dec. 22, 2005

(51) Int. Cl.
*G06F 17/30*    (2006.01)
*G06Q 10/10*    (2012.01)

(52) U.S. Cl.
CPC ..................... *G06Q 10/10* (2013.01)
USPC ........................................ 707/769

(58) Field of Classification Search
CPC ................. G06F 17/30867; G06F 17/30864
USPC .................. 707/758, 769, 1–10, 100–104.1, 707/200–206
See application file for complete search history.

(56) References Cited

U.S. PATENT DOCUMENTS

| | | | |
|---|---|---|---|
| 6,549,915 B2 | 4/2003 | Abbott, III et al. | |
| 6,879,985 B2 * | 4/2005 | Deguchi et al. | 707/101 |
| 2002/0059201 A1 * | 5/2002 | Work | 707/3 |
| 2002/0082054 A1 | 6/2002 | Keinonen et al. | |
| 2002/0083025 A1 | 6/2002 | Robarts et al. | |
| 2002/0091667 A1 * | 7/2002 | Jaipuria et al. | 707/1 |
| 2002/0138471 A1 * | 9/2002 | Dutta et al. | 707/3 |
| 2002/0147708 A1 * | 10/2002 | Thomas et al. | 707/3 |
| 2002/0178161 A1 | 11/2002 | Brezin et al. | |
| 2004/0148275 A1 * | 7/2004 | Achlioptas | 707/3 |
| 2004/0181540 A1 | 9/2004 | Jung et al. | |
| 2005/0003804 A1 | 1/2005 | Huomo et al. | |
| 2005/0091202 A1 * | 4/2005 | Thomas | 707/3 |

OTHER PUBLICATIONS http://www.google.com/help/features.html, "Google Web Search Features", PhoneBook; printed on Sep. 24, 2004.
http://www.192.com, "192.com the largest UK directory enquiry service"; printed on Sep. 24, 2004.
http://people.yahoo.com, "Yahoo! People Search"; printed on Sep. 24, 2004.
http://www.spoke.com, "Spoke Software"; printed on Sep. 24, 2004.
http://www.linkedin.com, "Welcome to LinkedIn"; printed on Sep. 24, 2004.
http://www.friendster.com, "Friendster"; printed on Sep. 24, 2004.
Bin Yu, et al., "Searching Social Networks", AAMAS'03, Jul. 14-18, 2003, Melbourne, Australia, Copyright 2003 ACM 1-58113-683-8/03/0007, 8 pages.

(Continued)

*Primary Examiner* — Thu-Nguyet Le
(74) *Attorney, Agent, or Firm* — Ditthavong & Steiner, P.C.

(57) ABSTRACT

Systems and methods, applicable, for example, in employing a user's social network in providing that user with results to searches for individuals, businesses, content (e.g., pictures, music, software, and/or the like), and/or the like. Further, systems and methods whereby, for example, information regarding individuals having social connection to individuals, businesses, and/or the like identified via such search may be available.

20 Claims, 5 Drawing Sheets

(56) References Cited

OTHER PUBLICATIONS

Mexican Office Action for corresponding MX Application No. PA/a/2006/014669, Aug. 12, 2009, Mexico.

Korean Office Action for corresponding KR Application, No. 10-2009-7016002 dated Jul. 1, 2010, pp. 1-7.

Searching Social Networks, Yu et al., Proceedings of the second international joint conference on Autonomous agents and multiagent systems, pp. 65-72, 2003.

Non-final Office Action of the Corresponding Korean Application, No. 10-2009-7016002, dated Jan. 15, 2010.

Chinese office action for corresponding CN application No. 200580024258.4 dated Aug. 19, 2010, pp. 1-6.

* cited by examiner

SYSTEM AND METHOD FOR SOCIAL NETWORK SEARCH OPERATIONS

FIELD OF INVENTION

This invention relates to systems and methods for search operations.

BACKGROUND INFORMATION

In recent years, there has been an increase in the use of computers for search. For example, many people have come to employ Internet search engines, online directories, and the like in preference to conventional resources such as public libraries, paper telephone directories, and the like.

Accordingly, there may be interest in technologies that facilitate such use of computers.

SUMMARY OF THE INVENTION

According to various embodiments of the present invention there are provided systems and methods applicable, for example, in employing a user's social network in providing that user with results to searches for individuals, businesses, content (e.g., pictures, music, software, and/or the like), and/or the like.

It is noted that, according to various embodiments, information regarding, for instance, individuals having social connection to individuals, businesses, and/or the like identified via such search may be available. In various embodiments, information regarding the fitness, quality, and/or the like of a found result (e.g., an individual or business) might be provided (e.g., from the viewpoint of search criteria and/or the like).

DETAILED DESCRIPTION OF THE INVENTION

General Operation

According to embodiments of the present invention there are provided systems and methods applicable, for example, in employing a user's social network in providing that user with results to searches for individuals, businesses, content (e.g., pictures, music, software, and/or the like), and/or the like. Such searches might, for instance, seek individuals, businesses, and/or the like that match specified criteria.

In various embodiments, information regarding, for instance, individuals having social connection to individuals, businesses, and/or the like identified via such search may be available. Moreover, in various embodiments, evaluations, rankings, and/or the like regarding individuals, businesses, and/or the like identified via such search may be available.

In various embodiments, various functionality regarding security, privacy, and/or the like may be implemented.

Various aspects of the present invention will now be discussed in greater detail.

Search Functionality

According to various embodiments of the present invention, a user of a node and/or other computer wishing that his social network be employed in searching for individuals, businesses, and/or the like might, for example, indicate such a desire through a graphical user interface (GUI) and/or other interface provided by his node and/or other computer.

Figure 1:
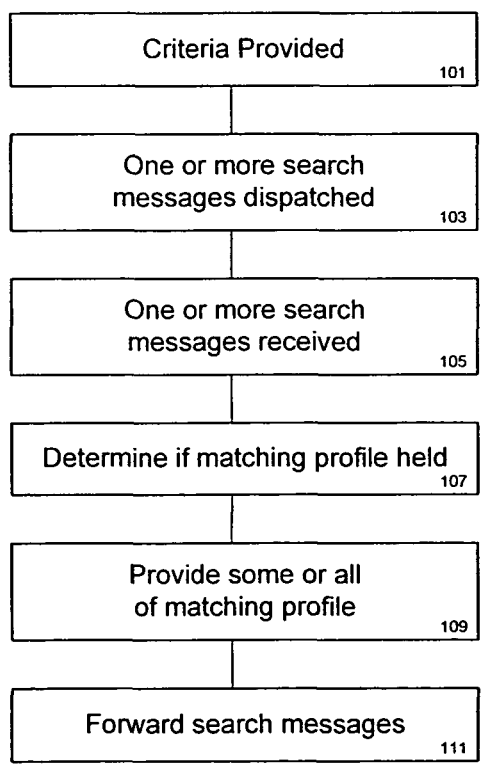
FIG. 1 shows exemplary steps involved in search functionality according to various embodiments of the present invention.

With respect to FIG. 1 it is noted that the user could, in various embodiments, provide, perhaps via the GUI and/or other interface, various criteria regarding the search to be performed (step 101). For example, the user might be able to specify the type of results that he wished to receive (e.g., individuals, businesses, and/or content).

As another example, the user might be able to specify various characteristics, attributes, words, phrases, and/or the like as criteria for the search. The characteristics, attributes, and/or the like might, in various embodiments, correspond to data held in profiles. Data held by profiles might include, for example, data regarding names, genders, ages, marital statuses, birthdays, email addresses, mobile telephone numbers, landline telephone numbers, fax numbers, universal resource locators (URLs), street addresses, cities, countries, jobs, companies, industries, professional experiences, educational information (e.g., degrees, graduation years, and/or schools), interests, stored public content, schedule information (e.g., diary), shared logs (e.g., visited places), and/or the like. It is noted that, in various embodiments, certain data held by a profile might be searchable by keyword. It is further noted that, in various embodiments, search criteria might be provided in Boolean form and/or the like.

Moreover, in various embodiments, search criteria might be able to include specifications of ranges of values (e.g., that a criteria have a value falling between two specified values), indication of "null", specification that search consider criteria similar to specified data be matching (e.g., words and/or phrases that sound like a specified word and/or value, that are synonyms, similar to, and/or the like with respect to a specified word and/or value, and/or the like), and/or the like. Accordingly, in various embodiments, "between", "like", and/or the like might be specifiable in searches.

In various embodiments, a depth indicator could be associated with a search. Such a depth indicator could, for instance, serve to specify extent of propagation of a search among nodes and/or other computers. The depth indicator associated with a search could be established in a number of ways. For instance, in various embodiments the depth indicator might be settable by the user (e.g., via a GUI and/or other interface provided by the node and/or other computer), a system administrator, a service provider, a manufacturer of the node and/or other computer, and/or the like. It is noted that, in various embodiments, depth indicators could be set for one or more specific searches, for all searches, for all searches matching certain criteria, and/or the like. It is noted that, in various embodiments, a depth indicator could, for example, act to define limits for a search within a social network. It is further noted that, in various embodiments, in the case where a depth indicator was depleted, had reached a certain threshold, and/or the like, propagation might proceed no further. Such a threshold might, in various embodiments, be set by a system administrator, service provider, and/or the like.

The user's node and/or other computer could, in various embodiments, act to dispatch one or more search messages corresponding to a search to be performed on behalf of its user (step 103). For instance, the node and/or other computer could act to dispatch one or more search messages to some or all nodes and/or other computers referenced in its stored one or more contacts, address book, logs (e.g., regarding sent and/or received calls, emails, Short Message Service (SMS) messages, Multimedia Messaging Service (MMS) messages, Bluetooth messages, and/or the like, mobile life blogs (e.g., logs regarding visited places, people met, and/or the like)), and/or the like.

It is noted that, in various embodiments, the user could, perhaps via a GUI and/or other interface, be able to specify that such search messages be sent to all nodes and/or other computers referenced in the stored contacts, address book, logs, and/or the like, to only certain such nodes and/or other computers (e.g., specified nodes and/or other computers, nodes and/or other computers matching specified criteria, nodes and/or other computers marked "public" and/or the like, nodes and/or other computers marked "private" and/or the like, nodes and/or other computers members of one or more certain contact groups and/or the like, and/or the like), and/or the like. It is noted that, in various embodiments, an appropriate depth indicator could be included in such one or more search messages and/or dispatched therewith.

Search messages could be dispatched in a number of ways. For example, SMS, MMS, Unstructured Supplementary Service Data (USSD), Simple Object Access Protocol (SOAP), Remote Method Invocation (RMI), Java Messaging Service (JMS), object push, Session Initiation Protocol (SIP), Transmission Control Protocol (TCP), General Packet Radio Service (GPRS), Universal Mobile Telecommunications Service (UMTS), Bluetooth, Ultra Wideband (UWB), wireless Firewire, Infrared Data Access (IrDA), WiFi (e.g., 802.11a, 802.11b, and/or 802.11g), wired connections (e.g., Ethernet), secure shell (SSH), and/or the like might be employed.

In various embodiments, authentication might be performed. It is further noted that, in various embodiments, a network operation and/or the like could, perhaps temporarily, bind a networking address (e.g., an Internet Protocol (IP) address or Bluetooth address) for a node and/or other computer to a host name incorporating a phone number and/or the like corresponding to the node and/or other computer. To illustrate by way of example, where a node and/or other computer had a phone number "212-555-1212", and a network operator was associated with a particular domain (e.g., samplenetworkoperator.com), a network address for the node and/or other computer might be bound to the host name 2125551212.samplenetworkoperator.com, 2125551212.nodes.samplenetworkoperator.com, and/or the like.

It is further noted that, in various embodiments, a node and/or other computer might advertise alternative network addresses to other nodes and/or other computers. Such an alternative address might, for instance, be used for subsequent queries, messages, and/or the like instead of the original one. To illustrate by way of example, where a node and/or other computer is reachable via a phone number "212-555-1212" and an IP address 10.30.1.17, another node and/or computer might, for instance, use the IP address for subsequent queries instead of, for instance, SMS over GSM. Additionally, a node and/or other computer might, for example, store various network addresses for contacts and change these subsequently, for instance, as the contacts changed their network addresses (e.g., in the case of dynamically changing IP addresses in a GPRS system). Alternately or additionally, SMS, MMS, and/or the like might, in various embodiments, be employed for various communications in the case where a network address was not known, not available any more (e.g., in the case where a node and/or other computer reached a region where there was GSM coverage but not GPRS coverage), and/or the like.

Included in search messages could, in various embodiments, be data corresponding to the search (e.g., specification of type of results, specification of various characteristics, attributes, and/or the like, and/or the like), a depth indicator, an identifier and/or the like employable in reaching the user's node and/or other computer (e.g., a telephone number, networking address (e.g., IP address), and/or the like), and/or the like. It is noted that, in various embodiments, some or all of such data might be in encrypted form, hashed form (e.g., message digest 5 (MD5) form), and/or the like. It is noted that, in various embodiments, a search message might contain one or more public keys.

It is noted that, in various embodiments, included with one or more such messages could be one or more profiles (e.g., a profile corresponding to the user, a business with which the user was affiliated, and/or the like). Profiles might be so included in accordance with a specification provided via the user, via defaults set by the user, and/or he like. Such specification, defaults, and/or the like might be provided, for instance, via a GUI and/or other interface.

A node and/or other computer receiving one or more search messages (step 105) might, in various embodiments, act to determine if it held any profiles that matched specified search criteria (step 107). In the case where such a matching profile was found, the node and/or other computer receiving one or more search messages could, in various embodiments, act to provide some or all of that profile to the user's node and/or other computer (step 109). In various embodiments, the node and/or other computer receiving one or more search messages might act to only provide those portions of a profile that had been specified to be "public". Such specification might, for example, be made by an individual, business, and/or the like associated with the profile, perhaps via a GUI and/or other interface provided by a node and/or other computer of the individual, business, and/or the like.

It is noted that, in various embodiments, a node and/or other computer might not possess profiles associated with other nodes and/or other computers (e.g., corresponding to users of other nodes and/or other computers, to businesses affiliated with users of other nodes and/or other computers, and/or the like), and instead might only possess profiles with which it was associated (e.g., the node and/or other computer might only possess one or more profiles corresponding to its own user, to one or more businesses affiliated with its own user, and/or the like). Accordingly, the node and/or other computer might, in various embodiments, act in response to one or more search messages, as appropriate, to provide some or all of one or more matching held profiles with which it was associated, to forward one or more of the received search messages to some or all nodes and/or other computers referenced in its stored contacts, address books, logs, and/or the like, and/or the like.

It is further noted that, in various embodiments, each node and/or other computer receiving the one or more search messages might, perhaps in a manner analogous to that discussed above, act to forward the one or more received search messages to some or all nodes and/or other computers referenced in its stored contacts, address books, logs, and/or the like (step 111). In the case where a depth indicator had been included in the received one or more search messages, the nodes and/or other computers that had received the one or more search messages from the user's node and/or other computer might, in various embodiments, consult the depth indicator before performing such forwarding, and only act to perform the forwarding in the case where, for example, the depth indicator had not been depleted (e.g., had not reached zero), the depth indicator had not reached a certain threshold, and/or the like.

Moreover, in various embodiments the nodes and/or other computers that received the one or more search messages from the user's node and/or other computer could, in various embodiments, act to alter such a depth indicator before forwarding it to the some or all nodes and/or other computers referenced in stored contacts, address books, logs, and/or the like. For instance, the depth indicator could be decremented by one.

The nodes and/or other computers that receive the forwarded one or more search messages could, in various embodiments, act in a manner analogous to the nodes and/or other computers that received the one or more search messages from the originating node and/or other computer. Accordingly, for instance, each such node and/or other computer could act, perhaps in a manner analogous to that discussed above, to determine if it held a profile that matched specified search criteria, act to provide some or all of such matching profiles to the originating node and/or other computer, act to forward the one or more search messages that it had received to some or all nodes and/or other computers referenced in stored contacts, address books, logs, and/or the like, act to consult and or alter a corresponding depth indicator, and/or the like.

Accordingly, the one or more search messages dispatched by the originating node and/or other computer could, in various embodiments, come to be received by a number of nodes and/or other computers in accordance with a social network of the originating node and/or other computer's user characterized, for instance, by connections between nodes and/or other computers established by entries in held contacts, address books, logs, and/or the like, and/or by depth indicator settings.

It is noted that, in various embodiments, in the case where a node and/or other computer, that possessed one or more profiles matching specified search criteria associated with one or more search messages, had received those search messages via forwarding performed by more than one node and/or other computer (e.g., where the same one or more search messages had been forwarded to the node and/or other computer by three different nodes and/or other computers), the node and/or other computer could, in various embodiments, act to inform the originating node and/or other computer of this fact. Such functionality could be implemented in a number of ways.

For example, in providing some or all matching profiles to the originating node and/or other computer, indication of the number of nodes and/or other computers that had so forwarded the one or more search messages might also be provided. Such a value could, in various embodiments, be interpreted as an indication of the number of individuals having social connection to individuals, businesses, and/or the like corresponding to the profiles.

As another example, the matching profiles and/or portions thereof could be provided to the node and/or other computer that initiated the search multiple times, one time for each node and/or other computer that had so forwarded the one or more search messages.

According to various embodiments of the present invention, the originating node and/or other computer might act to inform its user of results of the search. For instance, the user might, perhaps via a GUI and/or other interface of his node and/or other computer, be presented with some or all of received matching profiles and/or portions thereof. It is noted that, in various embodiments, a user could specify a search using Structured Query Language (SQL) format and/or the like, dispatched search messages could include search strings in SQL format and/or the like, and/or the like.

It is noted that, in various embodiments, information regarding the fitness, quality, and/or the like of a found result (e.g., an individual or business) might be provided (e.g., from the viewpoint of search criteria and/or the like).

Identity Functionality

Figure 2:
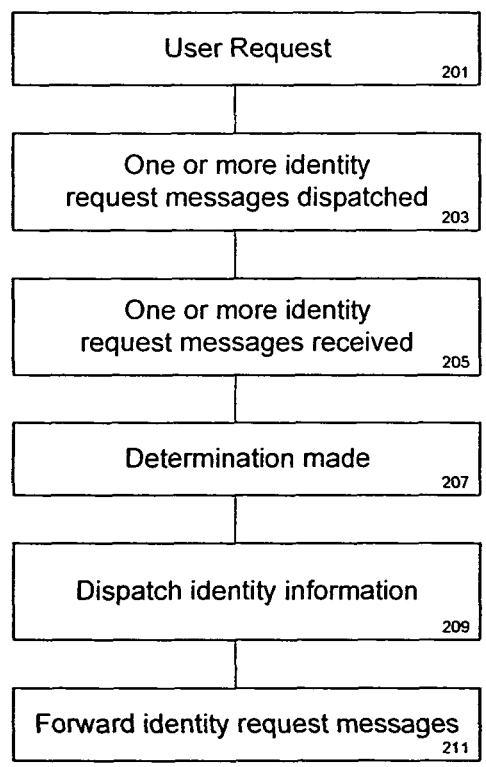
FIG. 2 shows exemplary steps involved in identity functionality according to various embodiments of the present invention.

According to various embodiments of the present invention, the node and/or other computer from which the one or more search messages originated may take action to obtain information regarding individuals having social connection to individuals, businesses, and/or the like identified as satisfying the search. With respect to FIG. 2 it is noted that, in various embodiments, such information might, in various embodiments, be provided in response to a request by the node and/or other computer's user (step 201). For example, the user might request that such information be provided for one or more indicated individuals, businesses, and/or the like identified as satisfying a search request. The user might provide such a request, for instance, via a GUI and/or other interface provided by the originating node and/or other computer.

In taking such action the originating node and/or other computer might, in various embodiments, act to dispatch one or more identity request messages to some or all nodes and/or other computers referenced in its stored contacts, address books, logs, and/or the like (step 203).

Included in such one or more identity request messages may, in various embodiments, some or all of the one or more search messages that yielded the indicated individuals, businesses, and/or the like (e.g., specification of type of results, specification of various characteristics, attributes, and/or the like, and/or the like), various data corresponding to the indicated individuals, businesses, and/or the like (e.g., some or all of one or more corresponding profiles received by the originating node and/or other computer responsive to the one or more search messages such as, for instance, one or more phone numbers), a depth indicator, an identifier and/or the like employable in reaching the originating node and/or other computer (e.g., a telephone number, networking address (e.g., IP address), and/or the like), and/or the like.

A node and/or other computer receiving such one or more identity request messages (step 205) might, in various embodiments, act to determine if its stored contacts, address books, logs, and/or the like referenced one or more individuals, businesses, and/or the like corresponding to the one or more identity request messages (step 207). Such functionality could be implemented in a number of ways. For instance, a node and/or other computer receiving the one or more identity request messages might act to determine if its stored contacts, address books, logs, and/or the like held data (e.g., a phone number) matching profile information (e.g., a phone number) received via the one or more identity request messages.

In the case where a node and/or other computer receiving the one or more identity request messages determined that its stored contacts, address books, logs, and/or the like referenced one or more individuals, businesses, and/or the like corresponding to the one or more identity request messages, the node and/or other computer, perhaps after receiving permission to do so from its user, may act to dispatch information regarding the identity of its user to the originating node and/or other computer (step 209). Such permission might, for example, be received via a provided GUI and/or other interface. It is noted that, in various embodiments, in the case where a user gave no answer to a query for such permission, operation could proceed as if the user had answered the request for permission in the negative. It is further noted that, in various embodiments, the user might be able to choose not to receive notification about incoming search messages (e.g., via a provided GUI and/or other interface), and where the user makes such a choice the node and/or other computer might, for instance, dispatch information regarding the identity of the user automatically, without user intervention, and/or the like.

Among such dispatched information regarding the user could, in various embodiments, be some or all of the profile of the user, some or all of an entry corresponding to the user in stored contacts, an address book, a log, and/or the like, and/or the like. Accordingly, for instance, a name and/or phone number for the user might be dispatched.

In various embodiments, the nodes and/or other computers receiving the one or more identity request messages from the originating node and/or other computer might, perhaps in a manner analogous to that discussed above, act to forward the one or more received identity request messages to some or all nodes and/or other computers referenced in held contacts, address books, logs, and/or the like (step 211). In various embodiments, in the case where a depth indicator had been included in the received one or more identity request messages, the nodes and/or other computers that had received the one or more identity request messages from the originating node and/or other computer might act in a manner analogous to that discussed above with regard to the depth indicator.

The nodes and/or other computers that received the forwarded one or more identity request messages could, in various embodiments, act in a manner analogous to the nodes and/or other computers that received the one or more identity request messages from the originating node and/or other computer.

Evaluation Functionality

It is noted that, in various embodiments, evaluations, rankings, and/or the like might be provided for one or more indicated individuals, businesses, and/or the like identified as satisfying a search request. Such functionality could be implemented in a number of ways.

Figure 3:
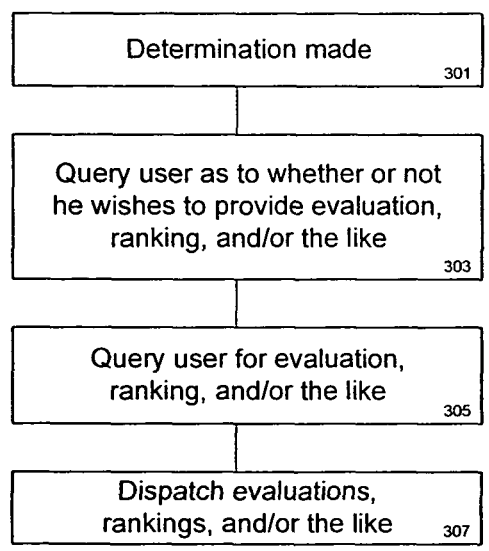
FIG. 3 shows exemplary steps involved in evaluation functionality according to various embodiments of the present invention.

With respect to FIG. 3 it is noted that, for instance, in the case where a node and/or other computer receiving one or more identity request messages determined that its stored contacts, address books, logs, and/or the like referenced one or more individuals, businesses, and/or the like corresponding to the one or more identity request messages (step 301), the node and/or other computer might act to dispatch to the node and/or other computer from which the one or more identity request messages originated one or more evaluations, rankings, and/or the like corresponding to those individuals, businesses, and/or the like (step 307).

Accordingly, for example, such a node and/or other computer that received one or more identity request messages might, perhaps via a GUI and/or other interface, query its user as to whether or not he wished to provide an evaluation, ranking, and/or the like for one or more of the referenced one or more individuals, businesses, and/or the like (step 303). In the case where the user responded in the affirmative the node and/or other computer could, in various embodiments, query its user for evaluation, ranking, and/or the like (step 305). Such querying might, for instance, be done via a GUI and/or other interface.

It is noted that, in various embodiments, the node and/or other computer could store one or more evaluations, rankings, and/or the like previously provided by its user and, in various embodiments, could, perhaps after seeking permission from its user (e.g., via a GUI and/or other interface) dispatch one or more such previous evaluations, rankings, and/or the like instead of and/or in addition to querying its user for a new evaluation, ranking, and/or the like as t just discussed.

It is further noted that, in various embodiments, previous evaluations, rankings, and/or the like might be stored with respect to the evaluated, ranked, and/or the like individuals, businesses, and/or the like. The node and/or other computer might, for instance, maintain a cache of evaluations, rankings, and/or the like, for example, in the form of a first-in-first-out (FIFO) buffer and/or the like.

Alternately or additionally, in various embodiments, previous evaluations, rankings, and/or the like might be stored with respect to the evaluated, ranked, and/or the like individuals, businesses, and/or the like along with corresponding queries, messages, and/or the like. For example, a contact might be ranked, evaluated, and/or the like, in a different manner if considering him as a professional as opposed to the case where being considered with respect to his hobbies, interests, and/or the like.

It various embodiments, in querying its user for one or more evaluations, rankings, and/or the like, the node and/or other computer could, perhaps via a GUI and/or other interface, inform its user of one or more previous corresponding evaluations, ranks, and/or the like, and query its user as to whether he wished to provide one or more new evaluations, rankings, and/or the like to the node and/or other computer from which the one or more identity request messages originated, or if he wished for the node and/or other computer from which the one or more identity request messages originated to receive previously provided evaluations, rankings, and/or the like.

It is noted that, in various embodiments, a user could choose to include one or more profiles along with evaluations, rankings and/or the like (e.g., a profile corresponding to the user, a business with which the user was affiliated, and/or the like). Profiles might be so included in accordance with a specification provided by the user, via defaults set by the user, and/or the like. Such specification, defaults, and/or the like might be provided, for instance, via a GUI and/or other interface.

It is further noted that, in various embodiments, statistical representations (e.g., averages) that took into account evaluations, rankings, and/or the like may be made available to a node and/or other computer (e.g., one from which the one or more identity request messages originated). Such a statistical representation might, perhaps, be weighted (e.g., a weighed average).

In various embodiments, a node and/or other computer could come to receive various evaluations, rankings, and/or the like specified by various individuals with respect to various individuals, businesses, and/or the like. For instance, in various embodiments, evaluations, rankings, corresponding statistical representations, and/or the like may be propagated among nodes and/or other computers. Such nodes and/or other computers could, in various embodiments, employ such received evaluations, rankings, and/or the like in a number of ways. For example, such evaluations, rankings, and/or the like could be employed such that search requests would have a higher probability of yielding highly-regarded individuals, businesses, and/or the like than less highly-regarded individuals, businesses, and/or the like. Such functionality could be implemented a number of ways.

For example, in the case where such a node and/or other computer possessed more than one profile that that could satisfy a search request, the node and/or other computer might choose for dispatch to the node and/or other computer from which the search request originated one or more such profiles, with the probability of a particular such profile being chosen being determined, for instance, by the extent to which it was highly regarded according to evaluations, rankings, and/or the like. Accordingly, for instance, each such profile being considered as responsive to the search request might be assigned a value determined by the extent to which it was highly regarded according to evaluations, rankings, and/or the like. In various embodiments, the sum of all such assigned values for a set of profiles considered responsive to the search request might add up to one.

It is noted that, in various embodiments, a node and/or other computer so possessing more than one profile that could satisfy a search request might possess a cache of profiles received from various nodes and/or other computers. Such a cache could be filled in a number of ways.

For example, profiles might be exchanged, transferred, and/or the like between nodes and/or other computers, provided to one or more servers and/or the like, and/or the like. In various embodiments, in such exchange, transfer, and/or the like, certain profile fields (e.g., non-public fields) might only be sent if the recipient was also sending profiles that included those fields, a node and/or other computer might only send its user's profile to a recipient if that recipient was referenced in held contacts, a held address book, a held log, and/or the like, if a preference set by its user indicated that that the recipient should receive specified profiles (e.g., profiles corresponding to the user, other profiles, and/or the like), and/or the like. In various embodiments, profile exchange, transfer, and/or the like might, in the case where a profile to be sent was already held by the recipient, act to update any changed fields rather than to send the entire profile.

Moreover, in various embodiments, profile exchange might happen during an established connection (e.g., a telephone call between nodes and/or other computers). It is further noted that, in various embodiments, profile exchanges transfer, and/or the like might be performed in a manner analogous to that above (e.g., via object push). As another example, a node and/or other computer might come to possess one or more profiles by acting to store profiles that it received for purposes of passing it to an intended recipient (e.g., that it received from one node and/or other computer for purposes of passing to another node and/or other computer).

It is noted that, in various embodiments, in the case where a node and/or other computer possessed in held contacts, a held address book, a held log, and/or the like reference to one or more nodes and/or other computers expected to hold profiles responsive to a search request, the node and/or other computer could act, perhaps in a manner analogous to that discussed above, to forward the corresponding one or ore search messages to one or more of such nodes and/or other computers, with the probability of a particular node and/or other computer receiving the forwarding being determined, for instance, by the extent to which it was regarded according to evaluations, rankings, and/or the like (e.g., according to an average, weighted average, and/or other statistical representation regarding such evaluations, rankings, and/or the like).

The functionality by which the node and/or other computer could expect a node and/or other computer to hold a profile responsive to the search request could be implemented in a number of ways. For instance, the node and/or other computer might, perhaps as discussed above, hold a number of evaluations, rankings, and/or the like for a number of individuals, businesses, and/or the like, and for each such held evaluation, ranking, and/or the like have one or more corresponding values (e.g., phone numbers) of the sort held by one or more held, contacts, address books, logs, and/or the like such that, in forwarding a received search request to one or more nodes and/or other computers referenced by held contacts, address books, logs, and/or the like, it could recognize such a node and/or other computer as one whose corresponding individual, businesses, and/or the like was viewed with a certain regard (e.g., had a certain average evaluation, ranking, and/or the like) with respect to the characteristics and/or the like specified, sought, and/or the like by the search request. It is noted that, in various embodiments, a weighed average might be employed.

It is noted that, in various embodiments, it might be possible for a user to agree to provide a ranking, evaluation, and/or the like, but to request that that ranking, evaluation, and/or the like be anonymous. Accordingly, for example, a node and/or other computer receiving the evaluation, rank, and/or the like might not receive specification of the user that provided the rank, evaluation, and/or the like, the identity of that user might not be made available to the user of the node and/or other computer receiving the rank, evaluation, and/or the like, and/or one or more intermediate nodes and/or other computers might be employed in the dispatch of the ranking, evaluation, and/or the like from the node and/or other computer dispatching the ranking, evaluation, and/or the like.

In various embodiments, a user might be queried via a GUI and/or other interface provided by his node and/or other computer as to whether or not he was willing to have his identity revealed with regard to a ranking, evaluation, and/or the like. Moreover, in various embodiments, a user might be able to set a preference indicating that his evaluation, rankings, and/or the like be or not be anonymous, be or not be anonymous by default (e.g., that a GUI and/or other interface would query him, but his default would be considered the default answer by the interface), and/or the like.

It is noted that, in various embodiments, an evaluation, ranking, and/or the like of a individual, business, and/or the like might be-provided responsive to a search request and/or not responsive to one or more identity request messages. It is further noted that, in various embodiments, a node and/or other computer's user might be able to specifically request evaluation, ranking, and/or the like. Moreover, in various embodiments, a node and/or other computer may dispatch one or ore evaluation request messages and/or the like.

Centralized Operation

According to various embodiments of the present invention, various functionality discussed above could, perhaps in a manner analogous to that discussed above, be employed in centralized operation.

In various embodiments of the present invention, a node and/or other computer originating a search request may act to dispatch one or more search messages to one or more centralized servers and/or the like. Such one or more search messages might, for instance, be as discussed above and/or could, for instance, be dispatched as discussed above (e.g., TCP, SSH, SMS, MMS, and/or the like might be employed). As noted above, some or all data included in the one or more search messages might, various embodiments, be encrypted, hashed, and/or the like. In various embodiments, authentication may be performed. It is noted that, in various embodiments, a user could specify a search using SQL format and/or the like, dispatched search messages could include search strings in SQL format and/or the like, and/or the like.

The one or more centralized servers and/or the like could, in various embodiments, receive one or more contacts, address books, logs, profiles, and/or the like, and/or portions thereof, from nodes and/or other computers. It is noted that, In various embodiments, such contacts, address books, logs, profiles, and/or portions thereof may be received by the one or more servers and/or the like in encrypted form, hashed form (e.g., MD5 form and/or the like), and/or the like, and/or encryption, hashing, and/or he like might be performed after receipt.

Having received such one or more search messages the one or more centralized servers and/or the like could, in various embodiments, act to process the one or more search messages in view of contacts, address books, logs, profiles, and/or the like, and/or portions thereof, that had been received from one or more nodes and/or other computers referenced by contacts, address books, logs, and/or the like (and/or portions thereof) received from the node and/or other computer that had dispatched the one or more search messages.

It is noted that, in various embodiments, the referencing to the one or more nodes and/or other computers by the contacts, address books, logs, and/or the like (and/or portions thereof) received from the node and/or other computer that had dispatched the one or more search messages might be in the form of hashed values and/or the like (e.g., hashed telephone numbers), and these hashed values and/or the like might be matched with hashed values associated with the referenced nodes and/or other computers.

In performing the processing the one or more servers and/or the like could, in various embodiments, act to determine if any profiles received from the referenced one or more nodes and/or other computers matched specified search criteria. In the case where such a matching profile was found, the one or more servers and/or the like could, in various embodiments, act to make some or all of that profile available to the node and/or other computer from which the one or more search messages originated. In various embodiments, perhaps in a manner analogous to that discussed above, the one or more servers and/or the like might act to only provide those portions of a profile that had been specified to be "public".

The one or more servers and/or the like could act to make some or all of the profile available to the node and/or other computer from which the one or more search messages originated in a number of ways. For example, dispatch could be performed in a manner analogous to that discussed above. As another example, the one or more servers and/or the like could make some or all of the profile available for later retrieval by the node and/or other computer.

Accordingly, for instance, the node and/or other computer could periodically poll the one or more servers and/or the like to see if data was available for retrieval, and could, perhaps after receiving permission from its user (e.g., via a GUI and/or other interface) retrieve data that had been available. Such polling, retrieval, and/or the like might, for instance, be performed in a manner analogous to that discussed above (e.g., using TCP, SSH, SMS, MMS, and/or the like). It is noted that, in various embodiments, polling could involve provision of hashed identifiers, phone numbers, and/or the like.

It is noted that, in various embodiments, the one or more servers and/or the like might make available to the node and/or other computer from which the one or more search messages originated only one or more identifiers corresponding to an individual, business, and/or the like having a matching profile. One or more of such identifiers might, in various embodiments, be encrypted, and/or corresponding hashes (e.g., MD5 hashes) might be provided.

The one or more servers and/or the like might, in various embodiments, consult contacts, address books, logs, and/or the like, and/or portions thereof that had been received from the referenced one or more nodes and/or other computers to determine nodes and/or other computers referenced by those contacts, address books, logs, and/or the like, and/or portions thereof. The one or more servers could, in various embodiments, act with respect to one or more of the nodes and/or other computers referenced by those contacts, address books, logs, and/or the like, and/or portions thereof, in a manner analogous to that discussed above with respect to nodes and/or other computers referenced by contacts, address books, logs, and/or the like, and/or portions thereof that had been received from the node and/or other computer from which the one or more search messages originated.

Accordingly, in various embodiments, processing of contacts, address books, logs, profiles, and/or the like, and/or portions thereof that had been received from various nodes and/or other computers could traverse social connections among nodes and/or other computers, characterized, for instance, by node and/or other computer references in received contacts, address books, logs, and/or the like, in a manner perhaps analogous to that discussed above with respect to search messages wherein, for example, search messages are propagated among nodes and/or other computers in accordance with social connections.

According to various embodiments of the present invention, in the case where it was desired to, for example, obtain information regarding individuals having social connection to individuals, businesses, and/or the like identified as responsive to a search request a node and/or other computer might act to dispatch one or more identity request messages to the one or more servers and/or the like.

Such one or more identity request messages could, for example, be of the sort discussed above and/or could be dispatched as discussed above. Alternately or additionally one or more identity request messages could, in various embodiments, convey one or more phone numbers, identifiers, and/or the like, and/or corresponding hashes, corresponding to an individual, business, and/or the like having a profile matching a search request.

Alternately or additionally, the node and/or other computer might so dispatch one or more identity request messages to the one or more servers and/or the like in the case where it was desired to receive the identity, profile, and/or the like for an individual, business, and/or the like that had a profile identified as responsive to a search request.

In various embodiments, the one or more centralized servers and/or the like, having received one or more identity request messages seeking information regarding individuals having social connection to individuals, businesses, and/or the like identified as satisfying a search request, could, for example, act to process the one or more identity request messages in view of contacts, address books, logs, and/or the like, and/or portions thereof, that had been received from one or more nodes and/or other computers referenced by contacts, address books, logs, and/or the like (and/or portions thereof) received from the node and/or other computer that had dispatched the one or more identity request messages.

In performing such processing the one or more servers and/or the like could, in various embodiments, act to determine if reference was made, by contacts, address books, logs, and/or the like, and/or portions thereof, that had been received from one or more nodes and/or other computers referenced by contacts, address books, logs, and/or the like (and/or portions thereof) received from the node and/or other computer that had dispatched the one or more identity request messages, to one or more individuals, businesses, and/or the like corresponding to the one or more identity request messages. Such functionality could, for example, be implemented in a manner analogous to that discussed above. It is noted that, in various embodiments, some or all of the identity request messages, contacts, address books, logs, and/or the like, and/or portions thereof, might be in encrypted form and/or corresponding hashes might exist and, in various embodiments, such encrypted forms and/or hashes might be employed in processing.

In the case where it was determined that a node and/or other computer held contacts, address books, logs, and/or the like referencing one or more individuals, businesses, and/or the like corresponding to the one or more received identity request messages, the one or more servers and/or the like could, in various embodiments, act to, perhaps after seeking permission to do so from one or more individuals, businesses, and/or the like affiliated with that node and/or other computer, make available information regarding the identity of the one or more individuals, businesses, and/or the like affiliated with that node and/or other computer to the node and/or other computer that dispatched the one or more identity request messages.

Such functionality could be implemented in a number of ways. For example, permission could, in various embodiments, be sought in a manner analogous to that discussed above (e.g., via polling, dispatch, GUI and/or other interface, and/or the like). Moreover, in various embodiments, the information regarding the identity of the one or more individuals, businesses, and/or the like could be made available in a manner analogous to that discussed above (e.g., via polling, dispatch, GUI and/or other interface, and/or the like).

As a next step the one or more servers and/or the like could, in various embodiments, consult contacts, address books, logs, and/or the like, and/or portions thereof that had been received from one or more nodes and/or other computers referenced by contacts, address books, logs, and/or the like (and/or portions thereof) received from the node and/or other computer that had dispatched the one or more identity request messages. Via this consultation, the one or more servers and/or the like could, for instance, act to determine nodes and/or other computers referenced by those contacts, address books, logs, and/or the like, and/or portions thereof.

The one or more servers could, in various embodiments, act with respect to one or more of the nodes and/or other computers referenced by those contacts, address books, logs, and/or the like, and/or portions thereof, in a manner analogous to that discussed above with respect to nodes and/or other computers referenced by contacts, address books, logs, and/or the like, and/or portions thereof that had been received from the node and/or other computer from which the one or more identity request messages originated.

Accordingly, in various embodiments, handling of the received one or more identity request messages by the one or more servers and/or the like could traverse social connections among nodes and/or other computers, characterized, for instance, by node and/or other computer references in received contacts, address books, logs, and/or the like, in a manner perhaps analogous to that discussed above with respect to identity request messages wherein, for example, identity request messages are propagated among nodes and/or other computers in accordance with social connections.

In various embodiments of the present invention, having received such one or more identity request messages the one or more centralized servers and/or the like could, in the case where one or more identifiers and/or corresponding hashes were received therewith, act to, perhaps in a manner analogous to that discussed above, make a message available for later retrieval by one or more appropriate nodes and/or other computers (e.g., one or more nodes and/or other computers corresponding to the one or more identifiers and/or corresponding hashes), the message seeking permission to provide identity information and/or one or more corresponding profiles for the appropriate one or more individuals, businesses, and/or the like. Such functionality could, for example, be implemented in a manner analogous to that discussed above (e.g., polling functionality could be employed).

In the case where appropriate permission was granted, the one or more servers and/or the like could act, perhaps in a manner analogous to that discussed above (e.g, via polling functionality), to provide to the node and/or other computer that dispatched the one or more identity request messages appropriate identity information and/or one or more corresponding profiles for the appropriate one or more individuals, businesses, and/or the like. It is noted that, in various embodiments, a node and/or other computer so granting permission could act to encrypt appropriate profiles and/or identity information (e.g., a telephone number) and forward the encrypted profiles and/or identity information o the one or more servers and/or the like.

Encryption might, in various embodiments, be done using a public key corresponding to the node and/or other computer from which the one or more identity request messages originated. The encrypted profiles and/or identity information could then be made available by the one or more servers and/or the like (e.g., via polling functionality) to the node and/or other computer from which the one or more identity request messages originated.

It is further noted that, in various embodiments, in providing polling functionality the one or more servers and/or the like may identify messages and/or the like available for a node and/or other computer by an encrypted, hashed, and/or the like identifier corresponding to the node and/or other computer, and a node and/or other computer polling the one or more servers and/or the like might, in various embodiments, check for messages associated with its, perhaps encrypted, hashed, and/or the like, identifier.

It is noted that, in various embodiments, various functionality regarding evaluation, rankings, and/or the like of the sort discussed above could be provided in centralized operation, with such functionality, in various embodiments, being implemented in a manner analogous to that discussed above.

Rankings, evaluations, and/or the like could be provided, for instance, along with a response to one or more identity request messages, and/or could be provided otherwise (e.g., responsive to a search request and/or separately) but perhaps in a similar manner. In various embodiments, perhaps in a manner analogous to that discussed above, option could be given, for instance, to provide a new ranking, evaluation, and/or the like, and/or to employ a previously provided ranking, evaluation, and/or the like.

Accordingly, for example, rankings, evaluations, and/or the like could be made available to a node and/or other computer (e.g., one from which the one or more identity request messages originated). Such functionality could, in various embodiments, be implemented in a manner analogous to that discussed above (e.g., via polling SMS, MMS, SSH, TCP, and/or the like). In various embodiments, statistical representations (e.g., averages) that took into account stored previous evaluations, rankings, and/or the like could be made available to a node and/or other computer (e.g., one from which one or more identity request messages originated).

In various embodiments, the one or more servers and/or the like could, perhaps via operations of the sort discussed above, come to know of various evaluations, rankings, and/or the like specified by various individuals with respect to various individuals, businesses, and/or the like. The one or more servers and/or the like could, in various embodiments, employ such received evaluations, rankings, and/or the like in a number of ways. For example, such evaluations, rankings, and/or the like could be employed such that search requests would have a higher probability of yielding highly-regarded individuals, businesses, and/or the like than less highly-regarded individuals, businesses, and/or the like. Such functionality could, for instance, be implemented in a manner analogous to that discussed above.

It is noted that, in various embodiments, in the case where a depth indicator is included one or more received search messages and/or identity request messages in centralized operation, the one or more servers and/or the like might act in a manner analogous to that discussed above with regard to the depth indicator. It is further noted that, in various embodiments, a combination of centralized operation and non-centralized operation may be employed.

It is additionally noted that, in various embodiments, the one or more servers and/or the like might act to hold, have access to, and/or the like search, identity request, ranking messages, and/or the like, but perhaps not various of the other data and/or the like discussed above. Accordingly, for instance, nodes and/or other computers might periodically poll the one or more servers and/or the like for messages. Hashed phone numbers and/or the like might, in various embodiments, be employed. In the case where there were one or more messages for a node and/or other computer, its user, and/or the like (e.g., search messages), the node and/or other computer could, for instance, receive indication of such. The node and/or other computer might, for example, perhaps after informing its user of the one or more messages, act to effectuate reply, forwarding of one or more of the messages, and/or the like. The originator of the search could, for example, receive the reply the next time it polled the one or more servers and/or the like. The nodes and/or other computers to which forwarding was directed might, for example, receive the forwarded one or more messages the next time they polled the one or more servers and/or the like, and could, perhaps, respond.

Further Functionality

According to various embodiments of the present invention, various functionality could be implemented so as to enhance privacy, security, and/or the like. For instance, in various embodiments wildcard queries may be forbidden, participating address books, contacts, logs, and/or the like might need to be of at least a certain size (e.g., 10 entries), and/or the number of nodes and/or other computers whose contacts, address books, logs, profiles, and/or the like were involved in an operation might need to be of at least a certain value (e.g., two). Such values might, in various embodiments, be set by a system administrator, service provider, and/or the like. Moreover, as discussed above, various data may, in various embodiments, be in encrypted form, hashed, form, and/or the like.

It is further noted that, in various embodiments, intermediate nodes and/or other computers could be employed in order to, for instance, enhance privacy, security, and/or the like. Accordingly, for example, a node and/or other computer making a dispatch (e.g., of one or more search messages, one or more identity request messages, of one or more profiles and/or the like, and/or portions thereof), might act to make the dispatch to a node and/or other computer that would, in turn, pass the dispatch to the intended target.

Such an intermediate node and/or other computer might, for example, be one selected at random from contacts, address books, logs, and/or the like held by the node and/or other computer making the dispatch. In various embodiments, a user could be able to specify (e.g., via a GUI and/or other interface) that intermediate nodes and/or other computers be employed with respect to one or more particular dispatches, one or more types of dispatches, all dispatches, and/or the like that originate at his node and/or other computer.

Via such operation, for example, the identity of the node and/or other computer performing the dispatch could be hidden from the intended target of the dispatch. It is noted that, in various embodiments, such nodes and/or other computers so employed to pass a received dispatch to an intended target might not be consulted in operations regarding search messages, identity request messages, and/or the like. It is further noted that, in various embodiments, a chain of multiple intermediate nodes and/or other computers might be employed.

It is further noted that, in various embodiments, encryption keys (e.g., public and private keys) might be employed. For example, it might be required that a node and/or other computer, before communicating with the one or more servers and/or the like as discussed above (e.g., with respect to a search), would need to request certification from a certification authority and/or the like. Such a request might, for example, be sent via SMS, MMS, and/or the like. After performing appropriate operations the certification authority and/or the like could, in various embodiments, send a private key to the node and/or other computer and a corresponding public key to the node and/or other computer and/or to the one or more servers and/or the like. Such keys could, for instance, be employed in an SSH connection of the sort discussed above between the node and/or other computer and the one or more servers and/or the like.

It is noted that, in various embodiments, in the case where an individual, business, and/or the like is ranked, evaluated, and/or the like, is identified as satisfying one or more search messages, and/or the like, the individual, business, and/or the like might receive notification of such. Such notification could, for instance, be provided in a manner analogous to that discussed above (e.g., via dispatch of a message to a corresponding node and/or other computer, polling, and/or the like). It is noted that, in various embodiments, one or more intermediate nodes and/or other computers could be employed in such notification. It is further noted that, in various embodiments, one or more corresponding values could be imparted via such notification.

In various embodiments, one or more nodes and/or other computers corresponding an individual, business, and/or the like might act, perhaps in a manner analogous to that discussed above, to make available to, for instance, a node and/or other computer that dispatched one or more search messages and/or identity request messages, a statistical representation (e.g., an average) of ranking, evaluation, and/or the like for the individual, business, and/or the like, the statistical representation perhaps corresponding to a particular period of time.

It is noted that, in various embodiments, functionality described herein could be combined with the results of search engines (e.g., Internet search engines), employed to improve, refine, and/or the like the results of search engines, and/or the like. Such functionality could be implemented in a number of ways. For instance, results returned from a search engine might be refined via the dispatch of one or more corresponding search messages.

It is further noted that, in various embodiments, a user's identity might only be revealed to others (e.g., with respect to a provided search result, profile, ranking, evaluation, and/or the like) in the case where the user (e.g., via a GUI and/or other interface) explicitly gave permission that his identity be revealed.

As discussed above, in various embodiments various dispatches could be with respect to some or all of nodes and/or other computers referenced in contacts, an address book, a log, and/or the like. Such functionality could be implemented in a number of ways. For example, in various embodiments, a user could be queried (e.g., via a GUI and/or other interface) as for specification as to what node and/or other computer references should be employed. (e.g., the user could be able to specify that certain particular contacts entries, address book entries, log entries, and/or the like be employed).

As another example, a user could, in various embodiments, be able to specify criteria as to what node and/or other computer references should be employed (e.g., a user might specify that only nodes and/or other computers whose users are less than 30 years old receive dispatch). Such information regarding node and/or other computer users (e.g., ages) might be known, for example, via data in contacts, address books, logs, and/or the like, via received profiles, and/or the like.

It is noted that, according to various embodiments of the present invention, a user may be able to provide various settings regarding various of the operations discussed herein. Such settings might, for instance, be settable by a GUI and/or other interface provided by the user's node and/or other computer. It is further noted that, in various embodiments, a user could, perhaps via a GUI and/or other interface, be able to provide defaults, specifications, and/or the like regarding various operations described herein.

Accordingly, for example, a user might be able to provide defaults, specification, and/or the like regarding profiles (e.g., specification as to whether a profile should be kept private, should be made available to only nodes and/or other computers, servers, and/or the like referenced by contacts, an address book, a log, and/or the like corresponding to the user, should be made available to all, that the user should be queried (e.g., via a GUI and/or other interface) before any profile dispatch, and/or the like).

It is noted that, in various embodiments, forwarding of messages according to contacts, address books, logs, and/or the like might only be with respect to entities marked "public" and/or the like. It is further noted that, in various embodiments, Bluetooth, UWB, wireless Firewire, IrDA, WiFi, and/or the like might be used as an extension in the case where, for instance, operations via GPRS, UMTS, and/or the like were unsuccessful. It is further noted that, in various embodiments, Bluetooth, UWB, wireless Firewire, IrDA, WiFi, and/or the like might be employed such that forwarding was to proximal nodes and/or other computers (e.g., nodes and/or other computers in proximity for communication) as an alterative to and/or in addition to forwarding to one or more nodes and/or other computers referenced in contacts, address books, logs, and/or the like.

It is additionally noted that, in various embodiments, searching and/or other operations discussed herein could be performed with respect to other information than that which is described herein.

In various embodiments, a profile might be populated, created, and/or the like using data retrieved from public databases, data from a node and/or other computer's address books, contacts, logs, and/or the like, data from received electronic business cards, and/or the like. In various embodiments, such data could be filtered, sorted, and/or the like via social network.

Hardware and Software

Various operations and/or the like described herein may be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, phone, node, and/or the like, a server, a network access point, a network multicast point, a set-top box, a personal video recorder (PVR, a game console, or the like, perhaps running an operating system such as OS X, Linux, Darwin, Windows CE, Windows XP, Windows Server 2003, Palm OS, Symbian OS, or the like, perhaps employing the Series 40 Platform, Series 60 Platform, and/or Series 90 Platform, and perhaps having support for Java and/or .Net.

Figure 4:
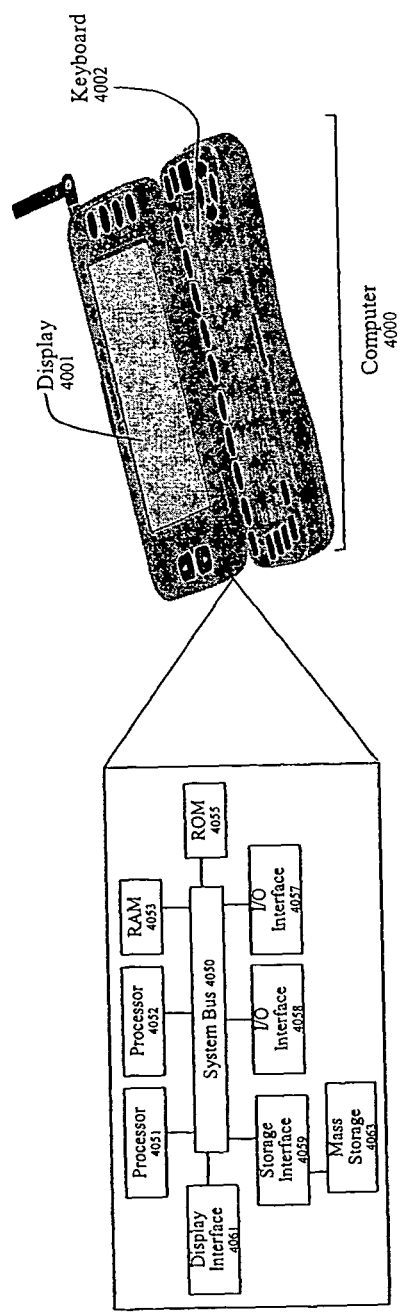
FIG. 4 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 4000 as shown in FIG. 4 includes system bus 4050 which operatively connects two processors 4051 and 4052, random access memory 4053, read-only memory 4055, input output (I/O) interfaces 4057 and 4058, storage interface 4059, and display interface 4061. Storage interface 4059 in turn connects to mass storage 4063. Each of I/O interfaces 4057 and 4058 may, for example, be an Ethernet, IEEE 1394, IEEE 1394b, IEEE 802.11a, IEEE 802.11b, IEEE 802.11g, IEEE 802.11i, IEEE 802.11e, EEE 802.11n, EEE 802.15a, IEEE 802.16a, IEEE 802.16d, IEEE 802.16e, IEEE 802.16x, IEEE 802.20, IEEE 802.15.3, ZigBee, Bluetooth, Wireless Universal Serial Bus (WUSB), wireless Firewire, terrestrial digital video broadcast (DVB-T), satellite digital video broadcast (DVB-S), Digital Audio Broadcast (DAB), General Packet Radio Service (GPRS), Universal Mobile Telecommunications Service (UMTS), Global System for Mobile Communications (GSM), DVB-H (Digital Video Broadcasting: Handhelds), IrDA (Infrared Data Association), and/or other interface.

Mass storage 4063 may be a hard drive, optical drive, or the like. Processors 4051 and 4052 may each be a commonly known processor such as an IBM or Motorola PowerPC, an AMD Athlon, an AMD Opteron, an Intel ARM, an Intel XScale, a Transmeta Crusoe, a Transmeta Efficeon, an Intel Xenon, an Intel Itanium, or an Intel Pentium. Computer 4000 as shown in this example also includes a touch screen 4001 and a keyboard 4002. In various embodiments, a mouse, keypad, and/or interface might alternately or additionally be employed. Computer 4000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, and/or Xen according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 5:
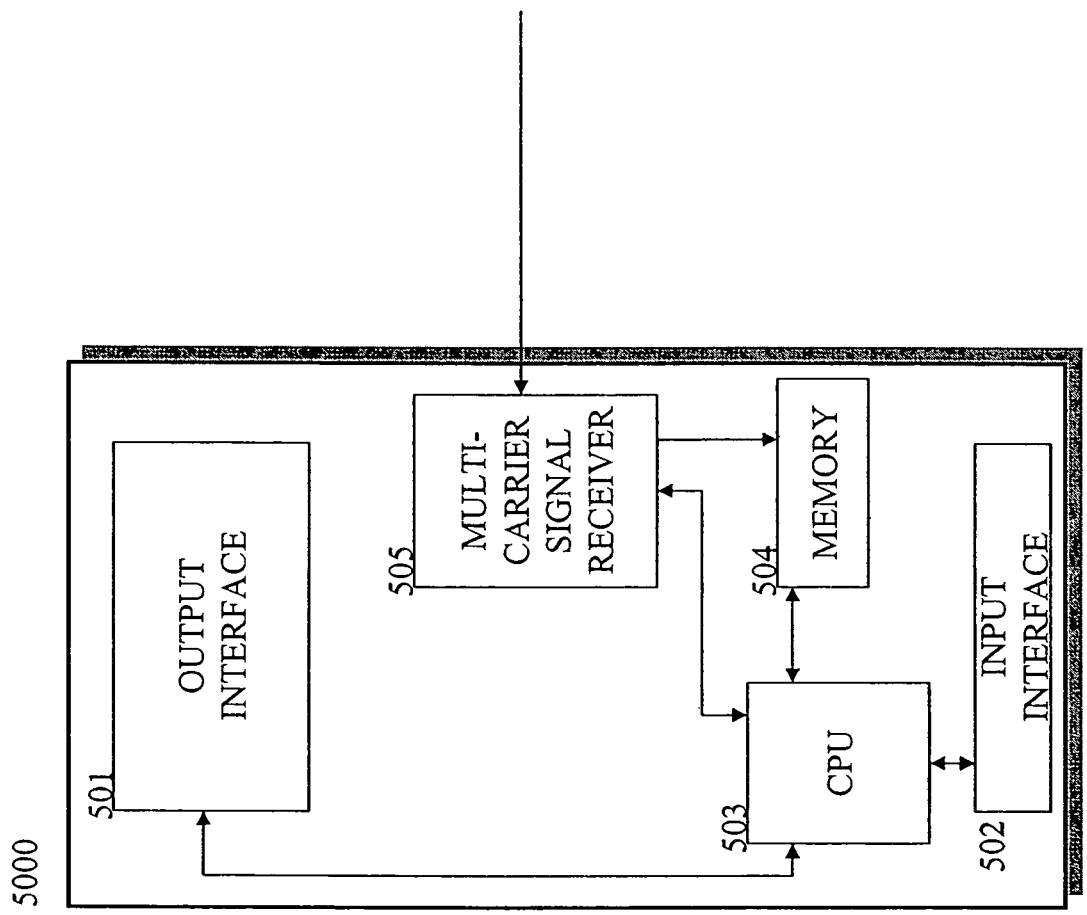
FIG. 5 shows a further exemplary computer.

Shown in FIG. 5 is a block diagram of a terminal, an exemplary computer employable in various embodiments of the present invention. In the following, corresponding reference signs are applied to corresponding parts. Exemplary terminal 5000 of FIG. 5 comprises a processing unit CPU 503, a multi-carrier signal terminal part 505, and a user interface (501, 502). The multi-carrier signal terminal part 505 and the user interface (501, 502) are coupled with the processing unit CPU 503. One or more direct memory access (DMA) channels may exist between multi-carrier signal terminal part 505 and memory 504. The user interface (501, 502) comprises a display and a keyboard to enable a user to use the terminal 5000. In addition, the user interface (501, 502) comprises a microphone and a speaker for receiving and producing audio signals. The user interface (501, 502) may also comprise voice recognition (not shown).

The processing unit CPU 503 comprises a microprocessor (not shown), memory 504 and possibly software. The software can be stored in the memory 504. The microprocessor controls, on the basis of the software, the operation of the terminal 5000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 5, alternatively, middleware or software implementation can be applied. The terminal 5000 can, for instance, be a hand-held device which a user can comfortably carry. The terminal 5000 can, for example, be a cellular mobile phone which comprises the multi-carrier signal terminal part 505 for receiving the multicast transmission stream. Therefore, the terminal 5000 may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method, comprising:
   in response to a search query received from an originating node, searching, at a user node, for one or more other user nodes corresponding to one or more profiles matching with search criteria specified in the search query and a depth indicator of a social network of a user of the user node;
   forwarding the search query from the user node to the one or more other user nodes;
   dispatching from the user node to the originating node at least part of a profile and an evaluation of a user corresponding to the profile, wherein the profile is received from at least one of the other user nodes and matches the search criteria.

2. A method of claim 1, further comprising:
   determining at the user node whether the at least part of the profile is marked as public; and
   determining at the user node whether permission to dispatch the at least part of the profile is obtained from the user,
   wherein the search criteria include one or more predetermined averaged evaluations made by other users within the social network for each other, and
   the at least part of the profile is dispatched to the originating node, only when the at least part of the profile is determined as marked as public or when the permission to dispatch is determined as obtained from the user corresponding to the profile.

3. A method of claim 1, further comprising:
   receiving at the user node from the one of the other user nodes the at least part of the profile matching the search criteria; and
   encrypting at the user node the at least part of the profile when the user node is permitted by a user of the one other node to encrypt the at least part of the profile,
   wherein the at least part of the profile is encrypted prior to being dispatched to the originating node, and
   a likelihood of the originating node receiving at least part of the profile depends upon the one or more predetermined averaged evaluations made by the other users within the social network.

4. A method of claim 1, further comprising:
   periodically polling the one or more other user nodes for another search query from another originating node, wherein the another search query specifies other search criteria;
   searching, at the user node, for one or more second user nodes corresponding to one or more profiles matching the other search criteria and another depth indicator indicating another depth of the social network of the user, the other search criteria include one or more other predetermined averaged evaluations made by other users within the social network for each other;
   forwarding the other search query from the user node to the one or more second user nodes; and
   dispatching from the user node to the another originating node at least part of a profile, that is received from at least one of the other user nodes and matches the other search criteria.

5. A method of claim 1, further comprising:
   periodically polling the one or more other user nodes for one or more profiles matching the search criteria among one or more profiles held at the one or more other user nodes;
   receiving from the one or more other user nodes at the user node at least part of a profile matching the search criteria; and
   forwarding from the user node the at least part of the profile to the originating node of the search query.

6. A method of claim 1, further comprising:
   determining at the user node a total number of times that the search query has received from the originating node and the one or more other user nodes; and
   dispatching from the user node the total number of times to the originating node of the search query,
   wherein the depth indicator is set by the user, one or more of the other users, a system administrator, a service provider, a manufacturer of user node, or a combination thereof.

7. A method of claim 1, further comprising:
   determining at the user node whether a search query received from the one or more other user nodes is originated from the originating node and has search criteria identical to the search criteria of the search query received from the originating node; and skipping dispatching the at least part of the profile to the originating node, when the search query received from the one or more other user nodes is originated from the originating node and has search criteria identical to the search criteria of the search query received from the originating node, and when the at least part of the profile has already dispatched to the originating node one time.

8. An apparatus comprising:

at least one processor; and at least one memory including computer program code for one or more programs, the at least one memory and the computer program code configured to, with the at least one processor, cause the apparatus to perform at least the following, in response to a search query received from an originating node, searching, at a user node, for;

one or more other user nodes corresponding to one or more profiles matching with search criteria specified in the search query and a depth indicator of a social network of a user of the user node;

forward the search query from the user node to the one or more other user nodes; and dispatch from the user node to the originating node at least part of a profile and an evaluation of a user corresponding to the profile, wherein the profile is received from at least one of the other user nodes and matches the search criteria.

9. An apparatus of claim 8, wherein the apparatus is further caused to:

determine at the user node whether the at least part of the profile is marked as public; and determine at the user node whether permission to dispatch the at least part of the profile is obtained from the user, wherein the search criteria include one or more predetermined averaged evaluations made by other users within the social network for each other, and the at least part of the profile is dispatched to the originating node, only when the at least part of the profile is determined as marked as public or when the permission to dispatch is determined as obtained from the user corresponding to the profile.

10. An apparatus of claim 8, wherein the apparatus is further caused to:

receive at the user node from the one of the other user nodes the at least part of the profile matching the search criteria; and encrypt at the user node the at least part of the profile when the user node is permitted by a user of the one other node to encrypt the at least part of the profile, wherein the at least part of the profile is encrypted prior to being dispatched to the originating node, and a likelihood of the originating node receiving at least part of the profile depends upon the one or more predetermined averaged evaluations made by the other users within the social network.

11. An apparatus of claim 8, wherein the apparatus is further caused to:

periodically poll the one or more other user nodes for another search query from another originating node, wherein the another search query specifies other search criteria;

search, at the user node, for one or more second user nodes corresponding to one or more profiles matching the other search criteria and another depth indicator indicating another depth of the social network of the user, the other search criteria include one or more other predetermined averaged evaluations made by other users within the social network for each other;

forward the other search query from the user node to the one or more second user nodes; and dispatch from the user node to the another originating node at least part of a profile, that is received from at least one of the other user nodes and matches the other search criteria.

12. An apparatus of claim 8, wherein the apparatus is further caused to:

periodically poll the one or more other user nodes for one or more profiles matching the search criteria among one or more profiles held at the one or more other user nodes;

receive from the one or more other user nodes at the user node at least part of a profile matching the search criteria; and forward from the user node the at least part of the profile to the originating node of the search query.

13. An apparatus of claim 8, wherein the apparatus is further caused to:

determine at the user node a total number of times that the search query has received from the originating node and the one or more other user nodes; and dispatch from the user node the total number of times to the originating node of the search query, wherein the depth indicator is set by the user, one or more of the other users, a system administrator, a service provider, a manufacturer of user node, or a combination thereof.

14. An apparatus of claim 8, wherein the apparatus is further caused to:

determine at the user node whether a search query received from the one or more other user nodes is originated from the originating node and has search criteria identical to the search criteria of the search query received from the originating node; and skip dispatching the at least part of the profile to the originating node, when the search query received from the one or more other user nodes is originated from the originating node and has search criteria identical to the search criteria of the search query received from the originating node, and when the at least part of the profile has already dispatched to the originating node one time.

15. A non-transitory computer-readable storage medium carrying one or more sequences of one or more instructions which, when executed by one or more processors, cause an apparatus to at least perform the following steps:

in response to a search query received from an originating node, searching, at a user node, for one or more other user nodes corresponding to one or more profiles matching with search criteria specified in the search query and a depth indicator of a social network of a user of the user node;

forwarding the search query from the user node to the one or more other user nodes; and dispatching from the user node to the originating node at least part of a profile and an evaluation of a user corresponding to the profile, wherein the profile is received from at least one of the other user nodes and matches the search criteria.

16. A non-transitory computer-readable storage medium of claim 15, wherein the apparatus is caused to further perform:

determining at the user node whether the at least part of the profile is marked as public; and determining at the user node whether permission to dispatch the at least part of the profile is obtained from the user, wherein the search criteria include one or more predetermined averaged evaluations made by other users within the social network for each other, and the at least part of the profile is dispatched to the originating node, only when the at least part of the profile is determined as marked as public or when the permission to dispatch is determined as obtained from the user corresponding to the profile.

17. A non-transitory computer-readable storage medium of claim 15, wherein the apparatus is caused to further perform:

receiving at the user node from the one of the other user nodes the at least part of the profile matching the search criteria; and encrypting at the user node the at least part of the profile when the user node is permitted by a user of the one other node to encrypt the at least part of the profile, wherein the at least part of the profile is encrypted prior to being dispatched to the originating node, and a likelihood of the originating node receiving at least part of the profile depends upon the one or more predetermined averaged evaluations made by the other users within the social network.

18. A non-transitory computer-readable storage medium of claim 15, wherein the apparatus is caused to further perform:

periodically polling the one or more other user nodes for another search query from another originating node, wherein the another search query specifies other search criteria;

searching, at the user node, for one or more second user nodes corresponding to one or more profiles matching the other search criteria and another depth indicator indicating another depth of the social network of the user, the other search criteria include one or more other predetermined averaged evaluations made by other users within the social network for each other;

forwarding the other search query from the user node to the one or more second user nodes; and dispatching from the user node to the another originating node at least part of a profile, that is received from at least one of the other user nodes and matches the other search criteria.

19. A non-transitory computer-readable storage medium of claim 15, wherein the apparatus is caused to further perform:

periodically polling the one or more other user nodes for one or more profiles matching the search criteria among one or more profiles held at the one or more other user nodes;

receiving from the one or more other user nodes at the user node at least part of a profile matching the search criteria; and forwarding from the user node the at least part of the profile to the originating node of the search query.

20. A non-transitory computer-readable storage medium of claim 15, wherein the apparatus is caused to further perform:

determining at the user node a total number of times that the search query has received from the originating node and the one or more other user nodes; and dispatching from the user node the total number of times to the originating node of the search query, wherein the depth indicator is set by the user, one or more of the other users, a system administrator, a service provider, a manufacturer of user node, or a combination thereof.

* * * * *